United States Patent
Bank et al.

(10) Patent No.: US 9,374,421 B2
(45) Date of Patent: Jun. 21, 2016

(54) MANAGEMENT OF DIGITAL CONTENT DISTRIBUTION

(71) Applicant: International Business Machines Corporation, Armonk, NY (US)

(72) Inventors: Judith H. Bank, Cary, NC (US); Liam Harpur, Dublin (IE); Ruthie D. Lyle, Durham, NC (US); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 14/286,195

(22) Filed: May 23, 2014

(65) Prior Publication Data

US 2015/0341434 A1  Nov. 26, 2015

(51) Int. Cl.
*G06F 15/16* (2006.01)
*H04L 29/08* (2006.01)

(52) U.S. Cl.
CPC ............ *H04L 67/1078* (2013.01); *H04L 29/08* (2013.01); *H04L 67/32* (2013.01)

(58) Field of Classification Search
CPC ..... H04L 67/32; H04L 67/1078; H04L 51/32; G06Q 30/02; G06Q 30/0201; G06Q 50/01; G06Q 10/107
USPC ..................... 709/203, 204; 370/338; 715/752
See application file for complete search history.

(56) References Cited

U.S. PATENT DOCUMENTS

| | | | |
|---|---|---|---|
| 7,184,524 B2 | 2/2007 | Digate et al. | |
| 7,363,345 B2 | 4/2008 | Austin-Lane et al. | |
| 8,166,119 B2 | 4/2012 | Ligh et al. | |
| 8,307,029 B2 | 11/2012 | Davis et al. | |
| 2005/0165891 A1 | 7/2005 | Moody et al. | |
| 2005/0165893 A1 | 7/2005 | Feinberg et al. | |
| 2008/0086431 A1 | 4/2008 | Robinson et al. | |
| 2012/0271722 A1* | 10/2012 | Juan | G06Q 10/04 705/14.72 |
| 2013/0097251 A1* | 4/2013 | Stibel | G06Q 30/0255 709/206 |
| 2013/0297543 A1* | 11/2013 | Treiser | G06Q 30/02 706/45 |
| 2015/0067533 A1* | 3/2015 | Volach | G06Q 10/107 715/752 |

* cited by examiner

*Primary Examiner* — Frantz Jean
(74) *Attorney, Agent, or Firm* — Mark G. Edwards; Dermott Cooke

(57) ABSTRACT

A method for sharing a content item from an originator with one or more first-order recipients may include receiving a first grouping of one or more first-order recipients that is selected to receive the content item from the originator. The method may also include receiving one or more distribution objectives from the originator. The method may also include selecting a first share time for the content item. The method may also include predicting a first predicted grouping of second-order recipients derived from the first grouping of first-order recipients for the content item at the first share time. The method may also include determining whether the distribution objectives are met for the content item. The method may also include sharing the content item at the first share time in response to the distribution objectives being met for the content item.

20 Claims, 5 Drawing Sheets

MANAGEMENT OF DIGITAL CONTENT DISTRIBUTION

BACKGROUND

The present disclosure relates to content distribution and more specifically, to digital content distribution.

Digital content distribution involves the use of an online delivery mechanism (e.g., the internet) for distributing digital content to multiple recipients. Digital content can include messages, video, photographs, news articles, etc. Originators of the digital content may attempt to send the content to as many recipients as possible. Social networks may be a delivery mechanism for distributing digital content. An originator may be involved in one or more social networks. Sharing onto the social network may impact the spread of the content.

SUMMARY

Embodiments of the present disclosure can provide for a method, a system, and a computer program product for selecting a share time for an originator to share a content item with one or more first-order recipients.

One embodiment provides for a method for sharing a content item from an originator with one or more first-order recipients. The method may include receiving a first grouping of one or more first-order recipients that is selected to receive the content item from the originator. The method may also include receiving one or more distribution objectives from the originator. The method may also include selecting a first share time for the content item. The method may also include predicting a first predicted grouping of second-order recipients derived from the first grouping of first-order recipients for the content item at the first share time. The method may also include determining whether the distribution objectives are met for the content item. The method may also include sharing the content item at the first share time in response to the distribution objectives being met for the content item.

Another embodiment provides for a system for use with a computer that is configured to host a social media application that allows a content item to be shared with a grouping of first order recipients. The system may include one or more computer processor circuits that are configured to host a sharing analysis application. The sharing analysis application may be configured to receive a first grouping of one or more first-order recipients that is selected to receive the content item from an originator. The sharing analysis application may be configured to receive one or more distribution objectives from the originator. The sharing analysis application may be configured to select a first share time for the content item. The sharing analysis application may be configured to predict a first predicted grouping of second-order recipients derived from the first grouping of first-order recipients for the content item at the first share time. The sharing analysis application may be configured to determine whether the distribution objectives are met for the content item. The sharing analysis application may be configured to share the content item at the first share time in response to the distribution objectives being met for the content item.

Another embodiment provides for a computer program product for sharing a content item from an originator with one or more first-order recipients. The computer program product comprising a computer readable storage device having a computer readable program stored therein, wherein the computer readable program, when executed on a computing device, causes the computing device to receive a first grouping of one or more first-order recipients that is selected to receive the content item from the originator. The computer readable program can also cause the computing device to receive one or more distribution objectives from the originator. The computer readable program can also cause the computing device to select a first share time for the content item. The computer readable program can also cause the computing device to predict a first predicted grouping of second-order recipients derived from the first grouping of first-order recipients for the content item at the first share time. The computer readable program can also cause the computing device to determine whether the distribution objectives are met for the content item. The computer readable program can also cause the computing device to share the content item at the first share time in response to the distribution objectives being met for the content item.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
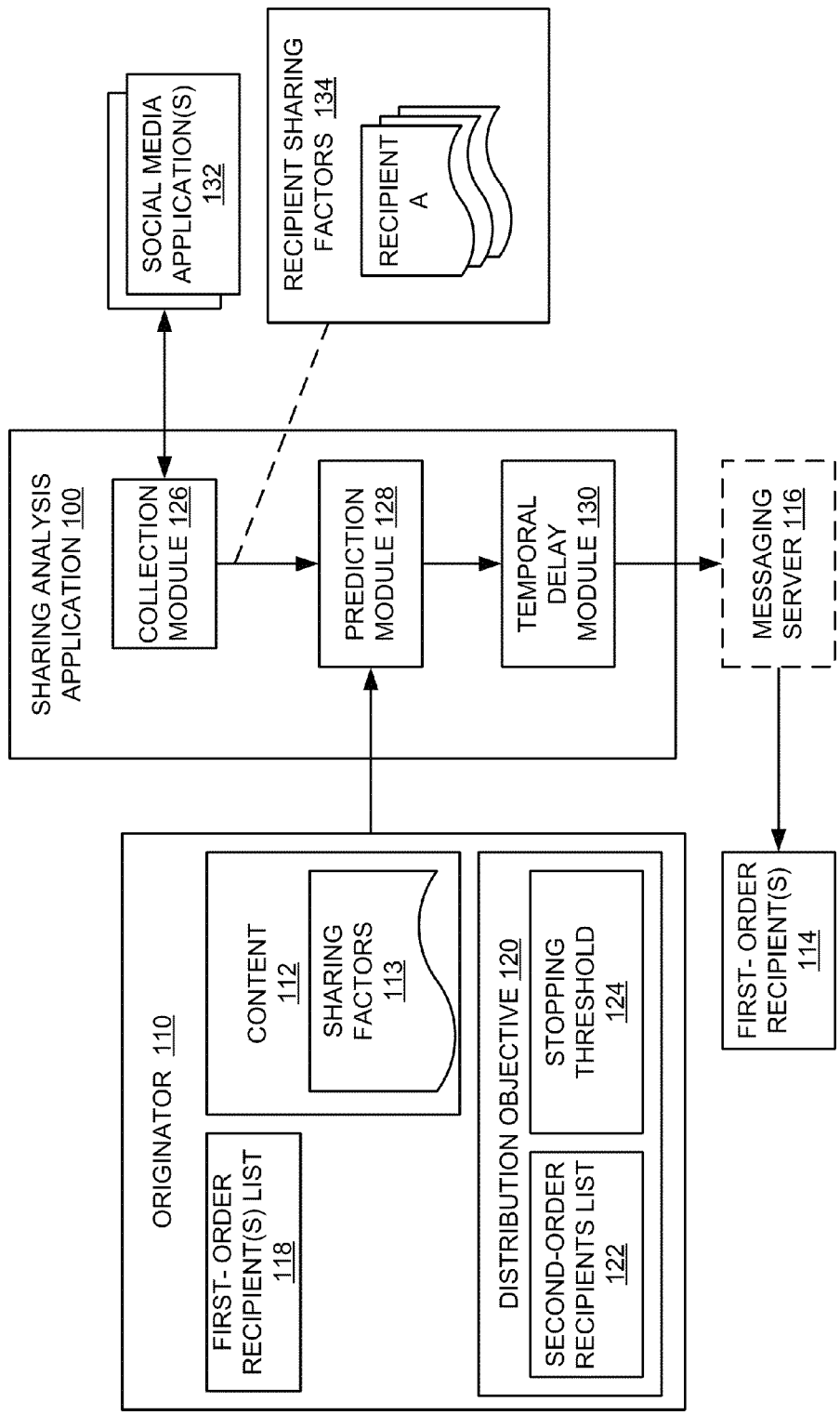
FIG. 1 illustrates a sharing analysis application configured to determine a share time of content with one or more first-order recipients to maximize a plurality of second-order recipients that receive the content, according to various embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

DETAILED DESCRIPTION

Aspects of the present disclosure relate to content distribution, more particular aspects relate to managing timing of digital content distribution. For instance, an originator can share a content item with one or more first-order recipients. A first-order recipient can share a content item with one or more second-order recipients. The originator can have a distribution objective and one or more content sharing factors associated with the content item. The first-order recipient sharing a content item with a second-order recipient can be predicted by analyzing recipient sharing factors for the first-order recipient with respect to the content sharing factors. The content item can be delayed to a share time that accomplishes the distribution objective. While the present disclosure is not necessarily limited to such applications, various aspects of the disclosure may be appreciated through a discussion of various examples using this context Individuals and businesses may be very interested and concerned about spreading ideas and information. For example, a company wants to spread the word about the company's social business amongst employees and the general public or a social activist want to spread their message about an issue. The sharing of information is often done as resharing or liking on a social media platform. In one example, userA reposts content from userB so userC can view the content. In this respect, userB can be considered an originator or originator of the content. UserB can share the content with a first-order recipient, userA. Aspects of the disclosure increase the number of second-order recipients that are able to view the content.

Individuals and companies may take into account the users that are "resharing" the content. For example, userC may trust userA and may be more susceptible to the message from userA. Due to a large amount of information, the timing may be important. For example, if digital distribution channels are not readily available, then the content is likely to be forgotten under the avalanche of new information.

In various embodiments, the content may not be sent or delivered until the recipient has logged into the social media platform and the recipient is likely able to re-distribute them socially using other channels. The awareness aspect may state to send messages if the recipient is in a position to distribute socially, e.g., the recipient usually distributes socially at this time and has most social networking logins working. Additionally, a recipient may advertise that all colleagues want to send messages when a criteria is met. When sending messages, the originator may get this notification of differential social aspects and changed behavior when handling the messages.

Aspects of the present disclosure may be performed by a sharing analysis application. The sharing analysis application can determine a share time for the content so that the content will reach a number of second-order recipients determined by the originator. The sharing analysis application can reside as part of a centralized system in an integrated social environment or as part of a distributed system. The sharing analysis application may be configured to activate based on a user depending on circumstances, e.g., sharing analysis enabled for senior managers.

FIG. 1 illustrates a sharing analysis application 100 configured to determine a share time of content with one or more first-order recipients to maximize a plurality of second-order recipients that receive the content, according to various embodiments. An originator 110 can send content 112 to, or share content 112 with, one or more first-order recipients 114. The first-order recipients 114 are recipients of the content 112. Each first-order recipient can also share the content 112 with one or more second-order recipients. The first-order recipients 114 can be identified through a first-order recipient list 118. The first-order recipient list 118 can be selected by the originator 110. In various embodiments, the first-order recipient list 118 may be a sharing factor 113 as discussed herein.

The content 112 can be also referred to as a content item herein. The content 112 can be associated with a number of sharing factors, or content sharing factors 113. The content sharing factors 113 are properties of the content 112 that can be used to predict how a first-order recipient 114 will share the content 112. For example, a content sharing factor 113 may include a category of the content 112 or a sharing platform of the content. Certain content sharing factors 113 may overlap with the recipient sharing factors 134.

The content 112 can be shared through a messaging server 116 responsible for delivering content to a first-order recipient 114. In various embodiments, the messaging server 116 can be optional. Any third-party application or system that is responsible for delivering shared content to a first-order recipient may be used in place of the messaging server 116. The messaging server 116 can be useful if content is delivered through a medium such as e-mail, or Short Message Service (SMS).

In various embodiments, in place of the messaging server 116, an internal social networking/social media application can be responsible for setting permissions for different recipients within the same environment as the originator. For example, a social networking application can grant access permission to a first order recipient 114 for the content 112. The access permission can be granted through an internal permissions module within a social networking application.

The sharing analysis application 100 can be configured to receive the content 112 and first-order recipients list 118 from an originator 110 and produce a recommendation on when to share content 112 with the first-order recipients 114 to maximize the distribution of the content 112. In various embodiments, the sharing analysis application 100 can recommend a modification of the first-order recipients list 118 to select first-order recipients that would be likely to redistribute the content 112.

The sharing analysis application 100 can receive distribution objectives 120 from the originator 110. The distribution objectives 120 can be the distribution goals of the originator in regard to reaching second-order recipients. The distribution objectives 120 can be a criteria/condition that causes the sharing analysis application 100 to recommend a share time that reaches the most second-order recipients possible. In various embodiments, the originator can set the distribution objectives 120. A user (if different than the originator), when composing a message may be notified of the preferences set by the originator.

The distribution objectives 120 can include a stopping threshold 124 for the sharing analysis application 100. The stopping threshold 124 can indicate when the sharing analysis application 100 can stop analyzing second-order recipients for the share time. The stopping threshold 124 can be a percentage of the second-order recipients list 122 that is reached. For example, if the stopping threshold is 50% of the second-order recipients in the second-order recipients list 122 that are reached, and the number of second-order recipients is 50, then the sharing analysis application 100 can stop analyzing the sharing of the first-order recipients when 25 second-order recipients from the second-order recipients list 122 are predicted to receive content.

The sharing analysis application 100 can have a collection module 126, a prediction module 128, and a temporal delay module 130. The collection module 126 can retrieve a variety of behavior data from various social media applications 132. In various embodiments, the collection module 126 can retrieve the behavioral activities, e.g. share times, times online, etc., of a first-order recipient and match the first-order recipient to usernames within the social media application 132. The collection module 126 can communicate with Application Programming Interfaces (APIs) of various social media applications 132. The collection module 126 can collect the behavior data for the first-order recipients. In various embodiments, the collection module 126 can be preloaded with frequently used first-order recipients and the information updated on a continual basis.

The collection module 126 can organize the behavioral data from the social media applications 132 into sharing factors 134 for each recipient, e.g., recipient A, recipient B, etc. The recipient sharing factors 134 can be arranged by each recipient from the first-order recipients list 118. The recipient sharing factors 134 can be further described herein. In various embodiments, the collection module 126 can store the sharing factors in a database for future access. For example, a first-order recipient, recipient A, of an originator 110 can have sharing factors 134 retrieved from the social media application 132 and the sharing factors are saved in a database. The database can be accessed by the collection module 126 to retrieve the sharing factors 134 whenever another originator shares content with recipient A.

A prediction module 128 can receive sharing factors 134 from the collection module 126. The prediction module 128 can be responsible for determining a prediction on whether second-order recipients will receive content. The prediction module 128 can use the sharing factors 134 to assemble a likelihood of a first-order recipient to share content 112 to a second-order recipient at a particular time. The particular time can be adjusted such that the likelihood of a first-order recipient sharing content 112 to a second-order recipient is predicted for multiple times. The prediction module 128 can present a share time that corresponds to a number of second-order recipients receiving the content 112 within the distribution objectives 120 of the originator 110.

The temporal delay module 130 can receive the share time from the prediction module 128 and delay the sharing of the content 112 with the first-order recipients 114. The time delay can be implemented by the user, according to various embodiments. For example, the originator 110 can be sent an alert that specifies that the present time is not favorable for second-order recipients receiving the content 112. The originator 110 can receive a recommendation of the time to share the content 112 and delay the sharing of the content 112 until the recommended time. The time delay can also occur in an automatic manner. For example, the prediction module 128 can recommend a share time and the temporal delay module 130 can wait until the current time is within the share time and forward the content 112 to the first-order recipient 114.

The sharing analysis application 100 can exist in a centralized system or a decentralized system. A centralized system can maintain the status of a first-order recipient's different social networking sites availability by querying an availability sever internal to a social networking environment. The sharing analysis application 100 can otherwise predict from historical records that the first-order recipient has been available, e.g., userX usually posts to a social network at 7 pm so infer that userX is available to disseminate at that time.

A distributed system restricts the originator to having existing tools to monitor the availability status (or inferred status) using local tools. In various embodiments, the restriction may be extended to check the calendar of the first-order recipients that would be republishing the information to determine whether the first-order recipients are busy in meetings or travelling or otherwise unlikely to be able to republish/share the content 112.

In various embodiments, the sharing analysis application 100 can overlap the communication channel for the first-order recipient with the intended social network availability. For example, the communication channel, e.g., an email address, should be in use (or likely to be in use) by userB in order to access the message, additionally userB must have other social media applications open.

The sharing analysis application 100 may also build a statistical distribution of the availability of the different channels for the recipients. For example, the distribution can infer that "userA is most social at 2 pm and has the maximal amount of social channels available".

Figure 2:
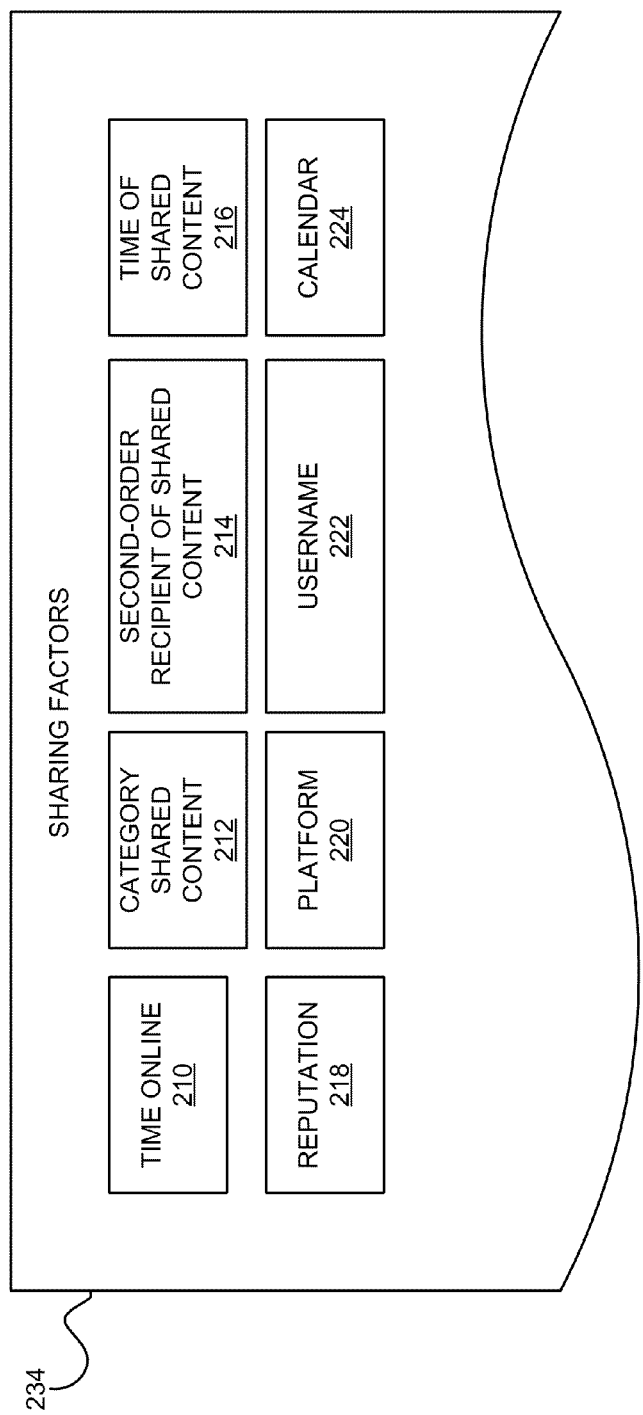
FIG. 2 illustrates sharing factors for a recipient, according to various embodiments.

FIG. 2 illustrates sharing factors 234 for a recipient, according to various embodiments. The sharing factors 234 can be collected by a collection module, e.g., the collection module 126 from FIG. 1, from a variety of social media applications. The sharing factors 234 can correspond to the sharing factors 134 from FIG. 1. The sharing factors 234 can also overlap with content sharing factors, e.g., the content sharing factors 113 in FIG. 1. Various sharing factors 234 can exist for a recipient, e.g., a first-order recipient. Although reference is made to a first-order recipient, sharing factors may also be used for a second-order recipient. The sharing factors 234 are presented for purposes of illustrations and not intended to be exhaustive. Furthermore, the sharing factors 234 may differ depending on the recipient.

The sharing factors 234 may include a time online 210, a category of shared content 212, a recipient of shared content 214, a time of shared content 216, a reputation 218, a platform 220, a username 222, and a calendar 224. The sharing factors 234 can be related to the sharing activity for a recipient.

The time online 210 can refer to the time that the recipient logs into the social media application. For example, a first-order recipient can log into the social media application at 1400 and log out at 1500. Both the log in and log out times and the duration can be recorded in the time online 210. In certain social media applications, a recipient may always be logged in but active during a certain time. The time online 210 sharing factor can also refer to the duration that the recipient spends active within the social media application.

The category of shared content 212 can refer to a category to which the shared content 212 fits. For example, a public message with the word "Cat" can fit into the category "pets". Multiple levels of categorization or multiple categories are possible for content. If the first-order recipient is a cat blogger, then the public message could be further categorized as "professional". If the first-order recipient is a programmer, then the public message could be categorized as "personal". The category 212 of the content can be aggregated and reflect the number of entries for each categories. For example, for a recipient, the category 212 can be "cats: 22 entries; dogs: 25 entries, personal: 99 entries."

The recipient sharing factor 214 of the shared content can be measured based on with whom the recipient shared content. The recipient sharing content with another entity can be used to predict how the recipient will share the content. For example, a first-order recipient, in a social networking application, can share content with 45 second-order recipients. The historical second-order recipients can be saved in the recipient sharing factor 214 in order to predict future second-order recipients.

The time sharing factor 216 of the shared content can also be noted. For example, if the first-order recipient is sharing content with second-order recipient A at 0200, and with second-order recipient B at 0300, then both the 0300 and 0200 times may be recorded.

The reputation sharing factor 218 can refer to the reputation of the recipient. The reputation of the recipient can be determined by the social media application. For example, if the recipient has a habit of posting chain letters or sharing content that is not wanted or blocked, then the recipient can have a negative reputation. The reputation can also be determined by the amount of shares. For example, if a first-order recipient typically shares content that is read or commented by 100 second-order recipients, then the social media application can assign the first-order recipient a good reputation. The reputation can also depend on the number of dislikes or complaints that the recipient has.

The platform 220 sharing factor can indicate the platform of the social media application. For example, a social media application A can have a different platform of social media application B. A recipient may have different activities performed on social media application A than social media application B. In various embodiments, each sharing factor can be arranged by platform with one platform indicating a variety of sharing factors. The recipient's behavior may change depending on the platform 220 used.

The sharing factor username 222 can indicate the one or more usernames used by the recipient. The recipient can have more than one username for a social media application. For example, in social media application A, the username may be an email address, and in social media application B, the username may be a unique number. The recipient can also use more than one username with different behaviors for each username. For example, a recipient can have a first username for business activities and a second username for personal activities within the same social media application.

The calendar 224 sharing factor can indicate a recipient's calendar schedule. For example, while traveling, a recipient may have different activities and usage patterns then when the recipient is at a desk during work hours. The calendar 224 can also indicate when a recipient is less likely to share content.

Figure 3:
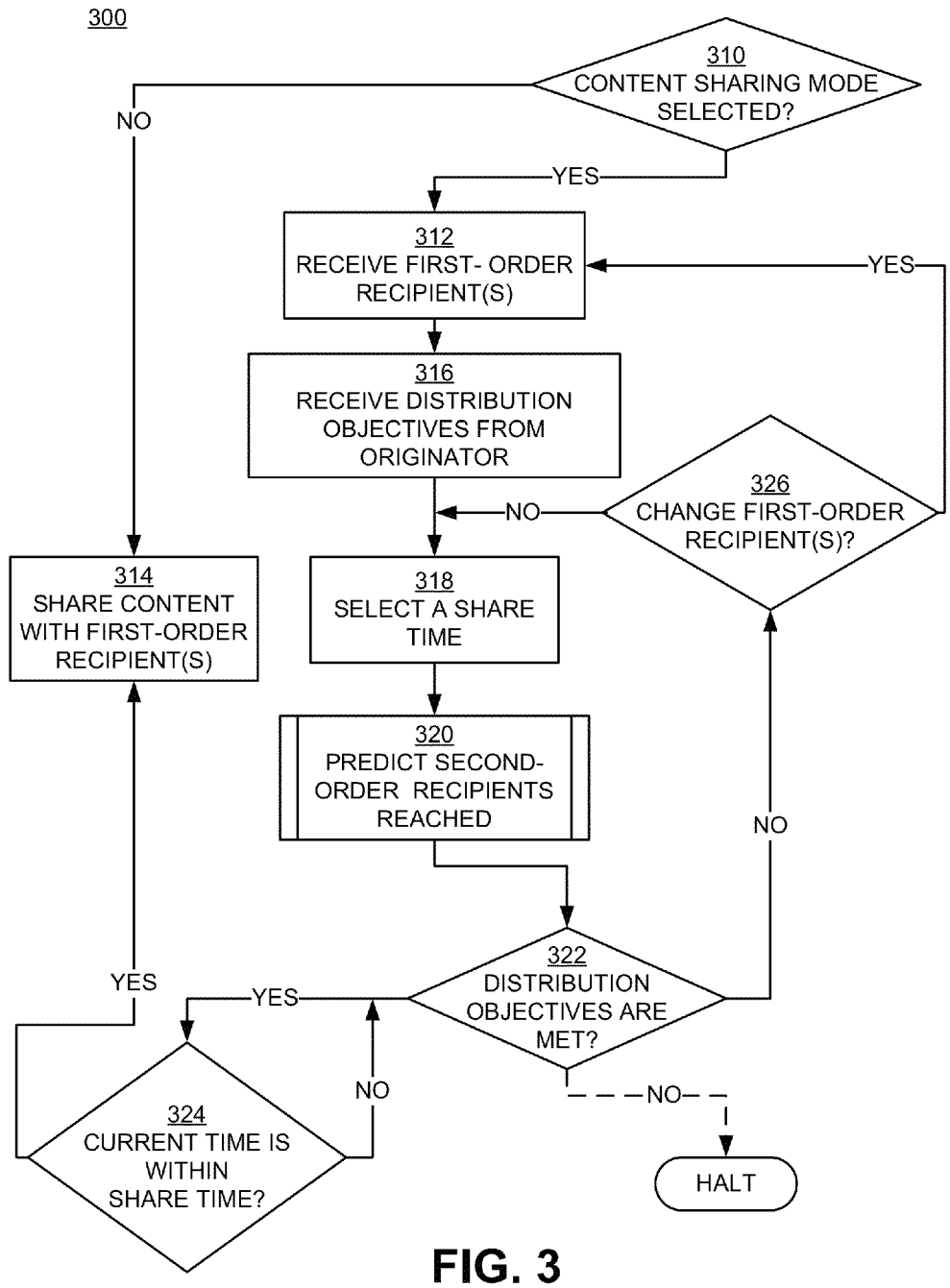
FIG. 3 illustrates a flowchart of a method for implementing a content sharing mode for a sharing analysis application, according to various embodiments.

FIG. 3 illustrates a flowchart of a method 300 for implementing a content sharing mode for a sharing analysis application, according to various embodiments. The method 300 can be performed by a sharing analysis application, e.g., the sharing analysis application 100 from FIG. 1. When an originator shares content with one or more first-order recipients, a content sharing mode can be selected to evaluate whether the first-order recipients will share the content to a sufficient number of second-order recipients further determined by the distribution objectives of the originator. The method 300 begins at operation 310.

In operation 310, the originator can select whether to enable content sharing mode. The content sharing mode can be selected at the originator level, e.g., a social media application. Once selected, then the sharing analysis application can receive an initiation command to implement the content sharing mode on behalf of the originator or requesting application. If there is no content sharing mode selected by the originator, then the method 300 continues to operation 314 where a content item is shared with the first-order recipients without analysis on whether the content item will reach a quantity of second-order recipients. If there is a content sharing mode selected, then the method 300 continues to operation 312.

In operation 312, the sharing analysis application can receive a first grouping of one or more first-order recipients. A first-order recipient is a recipient that is selected to receive content, i.e., a content item, from the originator. The selection of the first-order recipient can be performed by an application external to the sharing analysis application, according to various embodiments. The first-order recipient may be selected by the originator. In various embodiments, the originator can use a social media application to share the content item. The social media application can select the first-order recipients for the originator. For example, the social media application may share with all first-order recipients that the originator is connected to as a default setting, i.e., a public distribution. In various embodiments, the originator may share the content item with a class of first-order recipients. For example, an originator that is a project manager may want to share the content item with only project members. When the one or more first-order recipients are received, then the method continues to operation 316.

In operation 316, the sharing analysis application can receive distribution objectives from the originator. The distribution objectives can describe the second-order recipients that the originator wants to reach with the content item. In various embodiments, the distribution objectives can include a number of second-order recipients, e.g., 200 second-order recipients reached. The distribution objectives can also include specific second-order recipients, e.g., originator wants user A and user B to receive the content item. The distribution objectives can target a particular class of second-order recipients, e.g., teens, or millennials.

The distribution objectives can include a stopping threshold. The stopping threshold can indicate when the distribution objectives are fulfilled. According to various embodiments, the distribution objectives can include cascade analysis. In cascade analysis, the third-order recipients and fourth-order recipients can also be projected based on behavior predictions of the first-order recipients. Thus, the sharing analysis application can find combinations of share times and first-order recipients to fulfil far-reaching distribution objectives. For example, the sharing analysis application can have a distribution objective to find a combination of share times and first-order recipients to reach 20% of a social network's user base. In various embodiments, the distribution objectives can evolve and change upon the distribution objectives not being met. For example, if the sharing analysis application cannot reach 20% of a social network's user base, then the distribution objective can be lowered to 10% of the user base.

The distribution objectives can also include conditions. For example, an originator can specify that the sharing should reach as many people in as few sharing levels as possible. The originator can also specify that the distribution will only occur within a time band or without triggering junk mail filters which could ruin a reputation. The distribution objectives can be further described herein. Once the distribution objectives are received, then the method 300 continues to operation 318.

According to various embodiments, operation 318, operation 320, operation 322, and operation 326 can occur in an iterative manner. For example, for every share time selected, the sharing analysis application can make a prediction on the number of second-order recipients reached. If the number of predicted second order-recipients is not sufficient, then the sharing analysis application can select a different share time or a different set of first-order recipients. The sharing analysis application can continue until the distribution objectives are met. For example, the sharing analysis application can keep sharing until there are at least 4 comments.

In operation 318, the sharing analysis application can select a first share time for the content item. The share time refers to a future time when the content item will be shared. For example, if the current time is 0300, the share time can refer to a time after 0300 when the content item is planned to be shared. The share time can be selected at a prescribed interval based on the current time. For example, the initial share time can be selected by adding the current time plus 1 hour. Once the first share time is selected by the sharing analysis application, then the method 300 continues to operation 320.

In operation 320, the sharing analysis application can predict a first predicted grouping of second-order recipients derived from the first grouping of first-order recipients for the content item at the first share time. Each first-order recipient from the grouping of first-order recipients can share the content item with one or more second-order recipients. The predicted grouping can refer to the second-order recipients that are predicted to receive the content item from the first grouping of first-order recipients. The predicted grouping can be the aggregate of second-order recipients from the grouping of first-order recipients. In various embodiments, the predicted grouping can also be based on an individual first-order recipient.

Individual second-order recipients from a predicted grouping of second-order recipients may also overlap with another predicted grouping of second-order recipients derived from different first-order recipients. For example, if a first-order recipient A shares the content item with a second-order recipient C, then a first-order recipient B can also share the content item with the second-order recipient C. The prediction of the sharing analysis application can be described further herein. Once the sharing analysis application predicts the first predicted grouping of second-order recipients, then the method 300 continues to operation 322.

In operation 322, the sharing analysis application can determine whether the distribution objectives are met for the content item. As mentioned herein, the content item can have associated distribution objectives. The distribution objectives can involve quantities or identities of second-order recipients that should be reached by the content item. The distribution objectives can be specified by the originator. In an embodiment, the distribution objectives can be met when a certain quantity of second-order recipients is predicted to be reached. For example, if the distribution objectives are 100 second-order recipients and that at least 20 second-order recipients are millennials, then the distribution objectives are met when there are 200 second-order recipients with 30 of the second-order recipients being millennials. The distribution objectives would not be met if there are 100 second-order recipients with 10 of the second-order recipients being millennials.

In various embodiments, the originator can determine how to handle when the distribution objectives are not met. If the distribution objectives are not met, then the method 300 can halt or continue to operation 326. For example, the originator can specify that if the distribution objectives are not met, then the sharing analysis application should select another share time and try again. The originator can also specify that the sharing analysis application can alert the originator. The alert can be an audiotory, visual, or tactile communication to the originator that the share time was inadequate. The degree of inadequacy can also indicate the course of action or the alert. For example, if the distribution objective is 100 second-order recipients, and the sharing analysis application only predicts 3 second-order recipients reached, then the sharing analysis application can alert the originator and select another share time. If the sharing analysis application predicts 90 second-order recipients, then the sharing analysis application can select another share time without the alert. If the distribution objectives are met, then the method 300 can continue to operation 324.

In operation 324, the sharing analysis application can determine whether the current time is within the share time. In various embodiments, the sharing analysis application can delay the sharing of the content item with the first-order recipient. The delay can occur by the sharing analysis application determining the share time that accomplishes the distribution objectives of the originator. The sharing analysis application can wait for the current time to equal the share time, or be within a sufficient range of the share time. Once the current time is within the share time, then the method 300 can continue to operation 314 where the content item is shared with the first-order recipients. If the current time is not within the share time, then the method 300 continues to operation 322.

In operation 326, the sharing analysis application can determine whether to change the first-order recipients. The first-order recipients may be changed for a variety of reasons. According to various embodiments, the change in the first-order recipients may be recommended if a specific second-order recipient cannot be reached. For example, in a first grouping of 4 first-order recipients, if one of the distribution objectives is a specific second-order recipient that is not associated with any of the 4 first-order recipients, then the sharing analysis application can recommend to the originator to add another first-order recipient that is associated with the specific second-order recipient.

In various embodiments, the first-order recipients may be changed if adjustments of the share time do not produce sufficient increases in the quantity of second-order recipients reached. For example, assuming that share times of 0400, 0500, and 0600 are analyzed by the sharing analysis application, the prediction module can predict the share time of 0400 results in 200 second-order recipients, 0500 results in 210 second-order recipients, and 0600 results in 205 second-order recipients. If the distribution objective is 500 second-order recipients, then the sharing analysis application can determine that a second grouping of first-order recipients can be used.

If the first grouping for the first-order recipients does not need to be changed, then the method 300 continues to operation 318, where a second share time for the content item is selected. The prediction module can predict a second predicted grouping of second-order recipients derived from the first grouping of first-order recipients for the content item at the second share time.

If the sharing analysis application determines that the first grouping of first-order recipients needs to change, then the method 300 continues to operation 312 where the sharing analysis application can alert the originator to share the content item with a second grouping of first-order recipients. The second grouping of first-order recipients can include additional or fewer first-order recipients than the first grouping. The second grouping of the first-order recipients can be analyzed. For instance, the second grouping of the first-order recipients can be evaluated at a third share time which may be the same or different than the first share time. The prediction module can predict a third quantity of second-order recipients derived from the second grouping of first-order recipients for the content item at the third share time.

Figure 4:
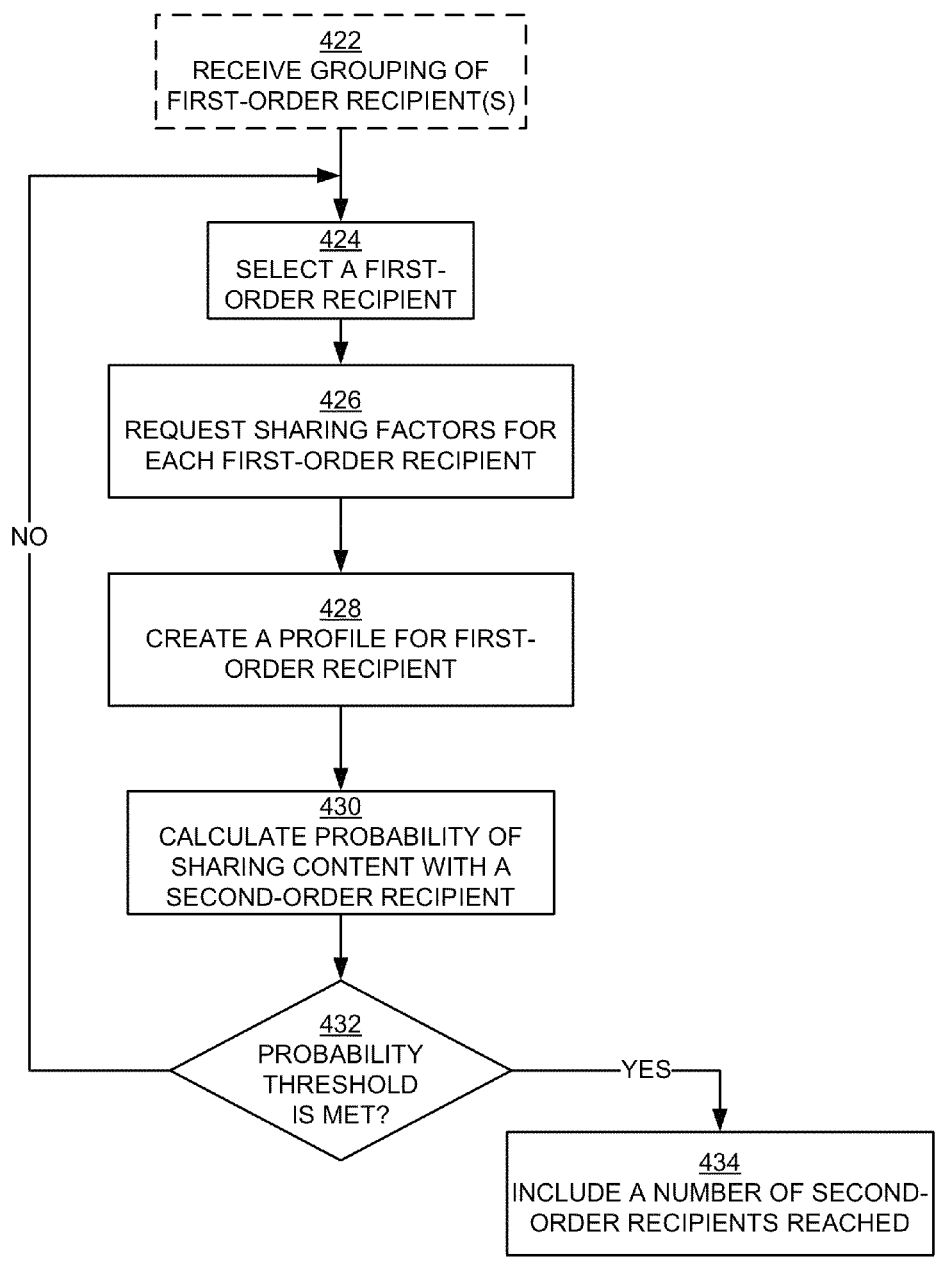
FIG. 4 illustrates a flowchart of a method for predicting second-order recipients reached given a share time, according to various embodiments.

FIG. 4 illustrates a flowchart of a method 420 for predicting second-order recipients reached given a share time, according to various embodiments. The method 420 may correspond to operation 320 from FIG. 3. Aspects of the method 420 can be performed by a prediction module, e.g., prediction module 128 in FIG. 1, within the sharing analysis application. The prediction module can predict whether a first-order recipient will share the content item with a second-order recipient. The prediction module can use a variety of sharing factors for each first-order recipient to create a profile for the first-order recipient. The profile can be used to calculate the probability of the first-order recipient sharing content with a second-order recipient at the given share time. If the probability threshold is met for the first-order recipient, the second-order recipient is counted as reached for later use. The method 420 can begin at operation 422.

In operation 422, the prediction module can receive a grouping of first-order recipients. The receiving of the grouping of first-order recipients can be considered optional. In various embodiments, the grouping of first-order recipients may be received from the originator in operation 312 in FIG. 3. Receiving the grouping of first-order recipients may also include receiving import data, e.g., sharing factors, regarding the content item for the first-order recipient. For example, the prediction module can include information on the proposed share time from the sharing analysis application, the services currently being used by the first-order recipient, the category of the content item from the originator, the calendar of the first-order recipient, and the platform used by the originator to the first-order recipient. Once the grouping of first-order recipients is received, then the method 420 continues to operation 424.

In operation 424, the prediction module can select a first-order recipient. In various embodiments, more than one first-order recipient can be selected at a time. For example, if first-order recipient A and first-order recipient B are selected, the prediction module can analyze the likelihood of the first-order recipient A sharing the content item with a second-order recipient and the likelihood of the first-order recipient B sharing the content item with a second-order recipient at the same time. Once the first-order recipient is selected, then the method 420 continues to operation 426.

In operation 426, the prediction module can request sharing factors for each first-order recipient from the first grouping of one or more first-order recipients. The prediction module can request the sharing factors from a collection module of the sharing analysis application. The collection module can gather the sharing factors from one or more social networks, e.g., through a social networking application programming interface. The collection module can organize the data regarding a first-order recipient's activity into the sharing factors. The sharing factors can be in a relational or non-relational format. Once the sharing factors are obtained by the prediction module, then the method 420 can continue to operation 428.

In operation 428, the prediction module can create a profile for a first-order recipient. The profile can be based on the recipient sharing factors. The profile can summarize the past sharing behaviors of the first-order recipient. The profile can indicate the historical behavior of the first-order recipient to analyze sharing behaviors. The profile can include any number of sharing factors that can enable the historical sharing behavior of the first-order recipient to be compared to the sharing factors from the content item. Once the prediction module creates a profile, then the method 420 continues to operation 430.

In operation 430, the prediction module can calculate a probability, based on historical sharing factors, of the selected first-order recipient sharing the first content item with one or more second-order recipients. The selected first-order recipient can share a content item with a second-order recipient. The probability can be based on a relationship of the profile of the first-order recipient to the content sharing factors. The prediction module can compare the profile of the first-order recipient to sharing factors from the originator sharing the content item. The prediction module can calculate the probability of the first-order recipient sharing a content item with a second-order recipient based on the profile. The second-order recipient can refer to either a particular second-order recipient or the second-order recipients as a class. For example, a first-order recipient can be evaluated for sharing to a public class where the model indicates factors on whether the first-order recipient will share publically a content item.

In one example, the prediction module can focus on the first-order recipient's historical time of shared content. The profile can indicate that the first-order recipient typically shares content between a time of 1800 and 1900. Thus, the prediction module can compare the times of when the first-order recipient shares content and determine that the probability is 84% that the first-order recipient will share content between a time of 1800 and 1900.

The prediction module can further apply sharing factors associated with the content item, e.g., a planned share time. The prediction module can narrow the probability range by including additional sharing factors from the content item. For instance, if the category of the content item is "personal", and the selected share time is between 1800 and 1900, then the prediction module can determine that the probability of the first-order recipient sharing personal content between the time of 1800 and 1900 is 96% based on the profile.

The probability can be further determined by taking into account the calendar of the first-order recipient. For example, if the calendar of the first-order recipient indicates that the first-order recipient will be traveling within the next two days, and the past sharing by the first-order recipient while traveling has been slight, then the prediction module can calculate the probability of the first-order recipient sharing personal content between 1800 and 1900 while traveling is 12%.

In various embodiments, the probability can be calculated by considering whether the first-order recipient has the capability to share the content item with a second-order recipient. For example, if the first-order recipient is logged onto a social network, then the first-order recipient has a higher probability of sharing a content item than if the first-order recipient is not logged onto a social network. Once the prediction module calculates the probability, then the method 420 continues to operation 432.

In operation 432, the prediction module can determine whether a probability threshold is met. A probability threshold can be related to a probability that a first-order user will share a content item to a second-order user. The probability can be calculated by the prediction module as discussed herein. The probability threshold can be a value that is met before the method 420 continues. For example, the probability threshold can be at least a 40% probability that the first-order recipient shares the content item with a second-order recipient. The probability threshold can be established based on more than one second-order recipient. For example, the probability threshold for the first-order recipient sharing the content item with 13 recipients can be 60% and the probability threshold for the first-order recipient sharing the content item with 14 recipients can be 40%. If the first-order recipient has a probability of sharing the content item of 40% with 13 recipients, then the probability threshold would not bet met. Once the prediction module determines that the probability threshold is met, then the method 420 continues to operation 434. If the probability threshold is not met, then the method 420 continues to operation 424 where another first-order recipient is selected.

In operation 434, the prediction module can include a selection of one or more second-order recipients reached in the first predicted grouping of second-order recipients in response to a probability threshold for the probability being met. The selection of one or more second-order recipients can be based on a prediction that the first-order recipient will share the content item with the second-order recipient. A predicted second-order recipient can be included in the overall prediction in method 420. For example, in a sharing analysis application having 2 first-order recipients, a first-order recipient A having 12 predicted second-order recipients and a first-order recipient B having 5 predicted second-order recipients, the prediction module can determine that can both first-order recipients have 17 predicted second-order recipients. If there are more first-order recipients, then the predicted second-order recipients of the additional first-order recipients can be added to the predicted second-order recipients.

Figure 5:
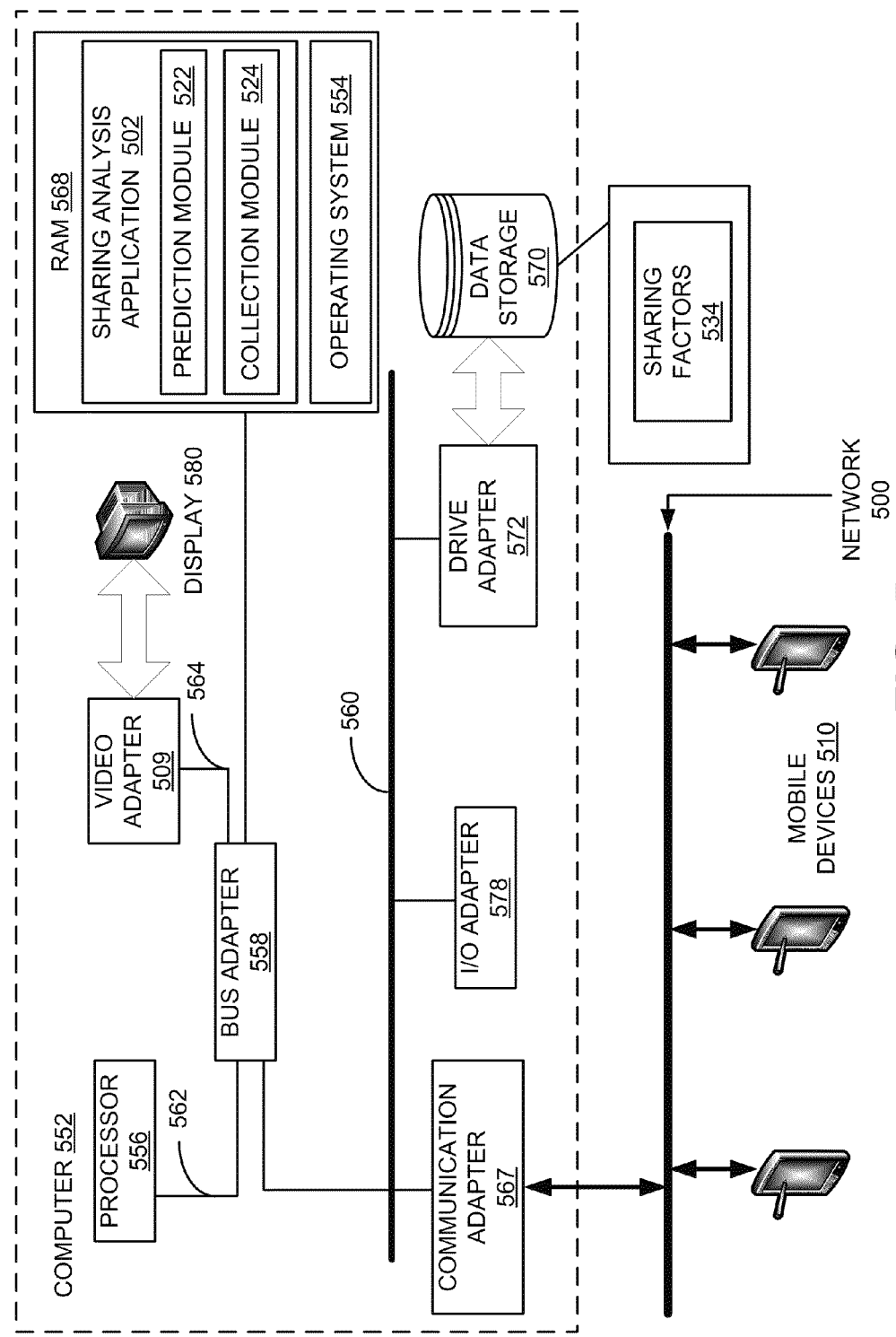
FIG. 5 illustrates a block diagram of automated computing machinery, according to various embodiments.

FIG. 5 illustrates a block diagram of automated computing machinery, according to various embodiments. The computing machinery may include example computer 552 useful in performing aspects of the disclosure, according to various embodiments. The computer 552 of FIG. 5 includes at least one computer processor 556 or 'CPU' as well as random access memory 568 ('RAM') which is connected through bus adapter 558 to processor 556 and to other components of the computer 552.

The RAM 568 may host a sharing analysis application 502. The computer 552 allows a sharing analysis application 502 to analyze whether a first-order recipient is likely to share a content item at a share time and adjust the share time to achieve more second-order recipients. The sharing analysis application 502 can have a prediction module 522, and a collection module 524. The collection module 524 can collect a variety of sharing factors for the first-order recipient. The prediction module 522 can obtain the sharing factors for the first-order recipient and compare the sharing factors to the sharing factors for the content item to determine a probability of a first-order recipient sharing the content item with a second-order recipient. The sharing factors for the content item and the recipient can be stored into the data storage 570 in the sharing factors 534.

The RAM 568 may include an operating system 554. Operating systems useful for record filtering according to embodiments of the present invention include UNIX®, Linux®, Microsoft XP™, AIX®, IBM's i5/OS™, and others. The operating system 554 are shown in RAM (568), but many components of such software typically are stored in non-volatile memory also, such as, for example, on a disk drive 570.

The computer 552 may also include disk drive adapter 572 coupled through expansion bus 560 and bus adapter 558 to processor 556 and other components of the computer 552. Disk drive adapter 572 connects non-volatile data storage to the computer 552 in the form of disk drive 570. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on. The data storage 570 may include one or more storage devices in a tiered or non-tiered configuration. The data storage 570 can include the sharing factors 534.

The example computer 552 includes one or more input/output ('I/O') adapters 578. I/O adapters implement user-oriented input/output through, for example, software drivers and computer hardware for controlling output to display devices such as computer display screens, as well as user input from user input devices 581 such as keyboards and mice. The example computer 552 includes a video adapter 509, which is an example of an I/O adapter specially designed for graphic output to a display device 580 such as a display screen or computer monitor. Video adapter 509 is connected to processor 556 through a high speed video bus 564, bus adapter 558, and the front side bus 562, which is also a high speed bus.

The example computer 552 includes a communications adapter 567 for data communications with other computers 510, e.g., mobile devices, and for data communications with a data communications network 500. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, an engine, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for sharing a content item from an originator with one or more first-order recipients comprising:
   receiving a first grouping of one or more first-order recipients that is selected to receive the content item from the originator;
   receiving one or more distribution objectives from the originator;
   selecting a first share time for the content item;
   predicting a first predicted grouping of second-order recipients derived from the first grouping of first-order recipients for the content item at the first share time;
   determining whether the distribution objectives are met for the content item; and
   sharing the content item at the first share time in response to the distribution objectives being met for the content item.

2. The method of claim 1, further comprising:
   selecting a second share time for the content item in response to the distribution objectives not being met for the content item; and
   predicting a second predicted grouping of second-order recipients derived from the first grouping of first-order recipients for the content item at the second share time.

3. The method of claim 1, further comprising:
   selecting a second grouping of one or more first-order recipients to receive the content item from an originator;
   selecting a third share time for the content item; and
   predicting a third predicted grouping of second-order recipients derived from the second grouping of first-order recipients for the content item at the third share time.

4. The method of claim 1, wherein the predicting the first predicted grouping of second-order recipients includes:
   selecting a first-order recipient from the first grouping of one or more first-order recipients;
   receiving recipient sharing factors for the first-order recipient and content sharing factors for the content item;
   creating a profile for the first-order recipient based on the recipient sharing factors;
   calculating a probability, based on a relationship of the content sharing factors to the profile, of the first-order recipient sharing the content item with a selection of one or more second-order recipients; and including the selection of one or more second-order recipients in the first predicted grouping of second-order recipients in response to a probability threshold for the probability being met.

5. The method of claim 4, wherein at least one recipient sharing factor is selected from: time online, reputation, platform, category of shared content, second-order recipient of shared content, username of first-order recipient, time of shared content, and calendar of first-order recipient.

6. The method of claim 4, wherein receiving the recipient sharing factors includes:

requesting sharing factors from a social media application programming interface.

7. The method of claim 1, further comprising:

alerting the originator in response to the distribution objectives not being met for the content item.

8. A system for use with a computer that is configured to host a social media application that allows a content item to be shared with a grouping of first order recipients, the system comprising:

one or more computer processor circuits that are configured to host a sharing analysis application that is configured to:

receive a first grouping of one or more first-order recipients that is selected to receive the content item from an originator, receive one or more distribution objectives from the originator, select a first share time for the content item, predict a first predicted grouping of second-order recipients derived from the first grouping of first-order recipients for the content item at the first share time, determine whether the distribution objectives are met for the content item, and share the content item at the first share time in response to the distribution objectives being met for the content item.

9. The system of claim 8, wherein the sharing analysis application is configured to:

select a second share time for the content item in response to the distribution objectives not being met for the content item; and predict a second predicted grouping of second-order recipients derived from the first grouping of first-order recipients for the content item at the second share time.

10. The system of claim 8, wherein the sharing analysis application is configured to:

select a second grouping of one or more first-order recipients to receive the content item from an originator;

select a third share time for the content item; and predict a third predicted grouping of second-order recipients derived from the second grouping of first-order recipients for the content item at the third share time.

11. The system of claim 8, wherein the sharing analysis application is configured to predict the first predicted grouping of second-order recipients by:

selecting a first-order recipient from the first grouping of one or more first-order recipients;

receiving recipient sharing factors for the first-order recipient and content sharing factors for the content item;

creating a profile for the first-order recipient based on the recipient sharing factors;

calculating a probability, based on a relationship of the content sharing factors to the profile, of the first-order recipient sharing the content item with a selection of one or more second-order recipients; and including the selection of one or more second-order recipients in the first predicted grouping of second-order recipients in response to a probability threshold for the probability being met.

12. The system of claim 11, wherein at least one recipient sharing factor is selected from: time online, reputation, platform, category of shared content, second-order recipient of shared content, username of first-order recipient, time of shared content, and calendar of first-order recipient.

13. The system of claim 11, wherein receiving recipient sharing factors includes:

requesting sharing factors from a social media application programming interface.

14. A computer program product for sharing a content item from an originator with one or more first-order recipients comprising a computer readable storage device having a computer readable program stored therein, wherein the computer readable program, when executed on a computing device, causes the computing device to:

receive a first grouping of one or more first-order recipients that is selected to receive the content item from the originator;

receive one or more distribution objectives from the originator;

select a first share time for the content item;

predict a first predicted grouping of second-order recipients derived from the first grouping of first-order recipients for the content item at the first share time;

determine whether the distribution objectives are met for the content item; and share the content item at the first share time in response to the distribution objectives being met for the content item.

15. The computer program product of claim 14, wherein the computer readable program causes the computing device to:

select a second share time for the content item in response to the distribution objectives not being met for the content item; and predict a second predicted grouping of second-order recipients derived from the first grouping of first-order recipients for the content item at the second share time.

16. The computer program product of claim 14, wherein the computer readable program causes the computing device to:

select a second grouping of one or more first-order recipients to receive the content item from an originator;

select a third share time for the content item; and predict a third predicted grouping of second-order recipients derived from the second grouping of first-order recipients for the content item at the third share time.

17. The computer program product of claim 14, wherein the computer readable program causes the computing device to predict the first predicted grouping of second-order recipients by:

selecting a first-order recipient from the first grouping of one or more first-order recipients;

receiving recipient sharing factors for the first-order recipient and content sharing factors for the content item;

creating a profile for the first-order recipient based on the recipient sharing factors;

calculating a probability, based on a relationship of the content sharing factors to the profile, of the first-order recipient sharing the content item with a selection of one or more second-order recipients; and including the selection of one or more second-order recipients in the first predicted grouping of second-order recipients in response to a probability threshold for the probability being met.

18. The computer program product of claim 17, wherein at least one recipient sharing factor is selected from: time online, reputation, platform, category of shared content, second-order recipient of shared content, username of first-order recipient, time of shared content, and calendar of first-order recipient.

19. The computer program product of claim 17, wherein receiving the recipient sharing factors includes:
   requesting sharing factors from a social media application programming interface.

20. The computer program product of claim 14, wherein the computer readable program causes the computing device to:
   alert the originator in response to the distribution objectives not being met for the content item.

* * * * *